(12) United States Patent
Zehavi (10) Patent No.: US 6,212,659 B1
(45) Date of Patent: Apr. 3, 2001

(54) METHOD AND APPARATUS FOR PROVIDING ERROR PROTECTION FOR OVER THE AIR FILE TRANSFER

(75) Inventor: Ephraim Zehavi, Haifa (IL)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/287,411

(22) Filed: Apr. 7, 1999

Related U.S. Application Data (63) Continuation of application No. 08/865,646, filed on May 30, 1997, now abandoned.

(51) Int. Cl.$^7$ .................................................. H03M 13/00
(52) U.S. Cl. .............................................................. 714/755
(58) Field of Search .................................... 714/755, 748, 714/756, 786, 758, 752

(56) References Cited

U.S. PATENT DOCUMENTS

| | | | |
|---|---|---|---|
| 5,495,522 | 2/1996 | Allen et al. | 379/202 |
| 5,612,974 | 3/1997 | Astrachan | 375/295 |
| 5,638,399 | 6/1997 | Schuchman et al. | 375/202 |
| 5,666,370 | 9/1997 | Ganesan et al. | 371/37.01 |
| 5,673,291 | 9/1997 | Dent | 375/262 |
| 5,713,075 | 1/1998 | Treadgill et al. | 455/427 |
| 5,815,514 * | 9/1998 | Gray | 714/775 |
| 5,930,230 * | 7/1999 | Odenwalder et al. | 370/208 |

FOREIGN PATENT DOCUMENTS

| | | |
|---|---|---|
| 8-330978 | 12/1996 | (JP) . |
| 9622639 | 7/1996 | (WO) . |

OTHER PUBLICATIONS

Aridhi, et al. "Performance Analysis of Type–I and Type–II Hybrid ARQ Protocols Using Concatenated Codes in a DS–CDMA Rayleigh Fading Channel" IEEE Conference 4: 748–752 (Nov. 6–10, 1995).

Cain, et al. "Punctured Convolutional Codes of Rate (n–1)/n and Simplified Maximum Likelihood Decoding" IEEE IT–25(1): 97–100 (Jan. 1979).

Viterbi, A. "Convolutional Codes and Their Performance in Communication Systems" IEEE Transactions on Communications Technology COM–19(5): 751–772 (Oct. 1971).

Yasuda, et al. "Development of Variable–Rate Viterbi Decoder and its Performance Characteristics" Sixth Int'l Conference on Digital Satellite Communications: X11–24–XII31 (Sep. 19–23, 1983).

"TIA/EIA IS–99: Data Services Option Standard for Wideband Spread Spectrum Digital Cellular Sytem" TIA/EIA Interim Standard: Jul. 1995.

* cited by examiner

*Primary Examiner*—Albert DeCady
*Assistant Examiner*—Shelly A Chase
(74) *Attorney, Agent, or Firm*—Philip Wadsworth; Kent D. Baker; Kyong H. Macek (57) ABSTRACT

In a communication system which conforms to the IS-99 standard, a concatenated code is used to provide for error free file transfer over the air. The concatenated code comprises Reed-Solomon coding, CRC block coding, and convolutional coding. The file is partitioned into data frames and Reed-Solomon encoding is performed on the data frames. CRC block encoding is then performed on the Reed-Solomon encoded data. The CRC encoded data is convolutionally encoded. The CRC block encoding and convolutional encoding are performed in accordance with the IS-99 standard. The additional Reed-Solomon encoding step provides improved error correction capability while maintaining compatibility with the IS-99 standard. At the receiver, Reed-Solomon decoding is performed if the number of erasures in a code word is less than or equal to (n–k) or the symbol errors in a code word is less than or equal to (n–k)/2. Otherwise, a request for retransmission is sent.

25 Claims, 11 Drawing Sheets

| | CRC bits | |
|---|---|---|
| CRC ENCODED FRAME 1 | m11 m21 m31 m41 m51 m61 R11 R21 R31 | C11 C21 C31 C41 C51 C61 C71 C81 C91 |
| CRC ENCODED FRAME 2 | m12 m22 m32 m42 m52 m62 R12 R22 R32 | C12 C22 C32 C42 C52 C62 C72 C82 C92 |

FIG. 5

Rows (labeled at left, reading bottom-to-top as drawn — CRC ENCODED FRAME 1 through 9):

| | | | | | | | | | CRC bits |
|---|---|---|---|---|---|---|---|---|---|
| CRC ENCODED FRAME 1 | m11 | m12 | m13 | m14 | m15 | m16 | m17 | m18 | m19 | C11 C12 |
| CRC ENCODED FRAME 2 | m21 | m22 | m23 | m24 | m25 | m26 | m27 | m28 | m29 | C21 C22 |
| CRC ENCODED FRAME 3 | m31 | m32 | m33 | m34 | m35 | m36 | m37 | m38 | m39 | C31 C32 |
| CRC ENCODED FRAME 4 | m41 | m42 | m43 | m44 | m45 | m46 | m47 | m48 | m49 | C41 C42 |
| CRC ENCODED FRAME 5 | m51 | m52 | m53 | m54 | m55 | m56 | m57 | m58 | m59 | C51 C52 |
| CRC ENCODED FRAME 6 | m61 | m62 | m63 | m64 | m65 | m66 | m67 | m68 | m69 | C61 C62 |
| CRC ENCODED FRAME 7 | R11 | R12 | R13 | R14 | R15 | R16 | R17 | R18 | R19 | C71 C72 |
| CRC ENCODED FRAME 8 | R21 | R22 | R23 | R24 | R25 | R26 | R27 | R28 | R29 | C81 C82 |
| CRC ENCODED FRAME 9 | R31 | R32 | R33 | R34 | R35 | R36 | R37 | R38 | R39 | C91 C92 |

Columns labeled (at bottom): CODE WORD 1, CODE WORD 2, CODE WORD 3, CODE WORD 4, CODE WORD 5, CODE WORD 6, CODE WORD 7, CODE WORD 8, CODE WORD 9

Labels: 34 (pointing to block); Reed-Solomon Parity Bits (pointing to R31)

METHOD AND APPARATUS FOR PROVIDING ERROR PROTECTION FOR OVER THE AIR FILE TRANSFER

This is a continuation application of Ser. No. 08/865,646, filed May 30, 1997, which is now abandoned.

BACKGROUND OF THE INVENTION

I. Field of the Invention

The present invention relates to data communications. More particularly, the present invention relates to a novel and improved communication system for providing error protection for over the air file transfer compatible with an IS-99 communication format.

II. Description of the Related Art

The complexity of modern day communication systems and the critical time to market factor have put great strain on the design of communication systems. The complexity stems from the large amount of signal processing, large number of hardware blocks, complicated data protocols, and numerous modes of operation. A microprocessor is typically required to coordinate and control the myriad of tasks.

The complexity of the system renders the design and debug tasks difficult. Special burden is placed on the software development since this stage must integrate the entire system, often under high schedule pressure. To mitigate system complexity and schedule pressure, some modern communication systems are designed with the ability to accept downloadable software or microcode over the air after system deployment. These systems are initially deployed with incomplete software functionality with plans to upgrade to new software releases as features are added or bugs are discovered and removed.

The design of a file transfer system must address the problem of correct reception by a large number of remote stations. In a typical communication system, data transmissions between a central station and the remote stations is hindered by impairments in the transmission channel, specifically additive noise and spurious signals within the transmission bandwidth. The signal may additionally be distorted by other phenomenons, such as multipath, before it reaches the remote stations. To combat these impairments and improve correct detection by the remote stations, the data is encoded before transmission.

Two classes of coding, block coding and convolutional coding, are utilized to improve correct reception. Convolutional code provides good error correcting capability but typically outputs correlated bursts of error. Block codes have built in burst error handling capability when combined with the proper level of interleaving. In fact, a Reed-Solomon block code can handle any burst of errors within a symbol. When convolutional coding alone does not produce the required coding gain, a concatenated code comprising a block code and a convolutional code can be used.

One such system which may need to transfer a large amount of data to many remote stations is a code division multiple access (CDMA) communication system which conforms to the "TIA/EIA/IS-99 Data Services Option Standard for Wideband Spread Spectrum Digital Cellular System", hereinafter referred to as the IS-99 standard. In accordance with the IS-99 standard, data is partitioned into data frames and block encoded to yield the frame quality indicators, or cyclic redundancy check (CRC) bits. The data bits and CRC bits are convolutionally encoded and transmitted over the air. The remote stations receive and demodulate the signal, convolutionally decode the data, and use the CRC bits to determine whether the data frames are received in error. The CRC bits allow detection of errors in transmission but do not provide error correction capability.

In accordance to the IS-99 standard, the data frames are encoded to form code channel frames which are 20 msec wide. On the forward link transmission from the central station to the remote stations, the symbol rate of each code channel is 19.2 Ksps. This translates to 384 symbols per code channel frame. Using a rate 1/2 convolutional encoder to encode the data, the data rate can be up to 9.6 Kbps. At the 9.6 Kbps data rate, there are 192 bits per code channel frame. In accordance to the IS-99 standard, the 192 bits are comprised of 172 information bits, 12 CRC bits, and 8 code tail bits. A higher data rate can be obtained by the use of other code rates. For example, a data rate of 14.4 Kbps is achieved by using a rate 1/2 convolutional encoder and deleting two out of every eight symbols, to obtain a punctured rate 3/4 convolutional encoder. In this case each code channel frame contains 576 symbols or 288 bits.

The CDMA communication system is a full duplex communication system. The remote stations communicate with the central station on an independent reverse link. Upon detection of uncorrectable frame errors, the remote stations transmit requests to the central station to retransmit the data frames received in error. If the central station attempts to download a large software file to a large number of remote stations, inadequate coding can result in many incorrectly received data frames. The central station can experience a bottleneck of requests from many remote stations, each requesting retransmission of different data frames. In this scenario, transmission of large software files to many remote stations can be greatly impaired by the inadequate coding gain provided by the IS-99 standard.

The convolutional encoder of a CDMA central station which conforms to the IS-99 standard is rate 1/2 (N=2) with a constraint length of 9 (K=9). The convolutional encoder encodes each input bit into N code bits called a code branch according to the set of N generator polynomials. Each generator polynomial G(x) computes one code bit. The N code bits are combined into an N-bit code branch. The constraint length K of the encoder is the number of data bits used in the encoding process and determines the error correcting capability of the code. Long constraint length K yields better performance at the expense of additional hardware and computational complexity. Since each input bit is encoded into N code bits, the code rate for the convolutional encoder is 1/N. Other code rates can be obtained from a 1/N code by puncturing the code bits. Punctured codes are treated by J. Cain, G. Clark, and J. Geist in "Punctured Convolutional Codes of Rate (n−1)/n and Simplified Maximum Likelihood Decoding," IEEE Transaction on Information Theory, IT-25, pgs. 97–100, January 1979. In fact, for the CDMA system, rate 1/2 and rate 3/4 convolutional encoding are used on the forward link transmission between the central station and the remote stations, with the rate selection dependent on the mode of operation of the central station.

A Viterbi algorithm is used to decode the transmitted code bits at the receiver. A discussion on the theory and operation of the Viterbi decoder is contained in the paper "Convolutional Codes and Their Performance in Communication Systems" by A. Viterbi, IEEE Transaction on Communication Technology, Vol. COM19, no. 5, October 1971, pgs. 821–835. The Viterbi algorithm performs the maximum likelihood decoding of the transmitted data path. For each received code branch, the branch metric of all branches entering each state is computed and added to the corresponding prior path metrics. The best path entering each state is selected and stored as the new path metrics. The selected path is stored in a path memory. In "Development of Variable Rate Viterbi Decoder and its Performance Characteristics," Sixth International Conference on Digital Satellite Communications, Phoenix, Ariz., September 1983, Y. Yasuda et al. show that the survivor paths with the lowest path metric all converge to the same path after certain trace back depth. Thus, a Viterbi decoded bit is obtained by tracing a path back by the trace back distance in the path memory.

The CRC block code used in the CDMA communication system in accordance to the IS-99 standard is a systematic, cyclic, and linear block code. CRC block coding is well known in the art and a good treatment of the topic is found in a number of references. In a systematic block code, the k data bits form the first k code bits of the code word. The n–k parity bits are formed by a linear combination of the k data bits according to the generator polynomial g(x). Because of the linear, systematic, and cyclic properties of the CRC block code, the encoding process is easily achieved with simple shift registers and exclusive-OR gates. Since n code bits are transmitted for k data bits, the code rate, or the reduction in data rate, is k/n.

In a CDMA system which conforms to the IS-99 standard, the data is encoded with a CRC block code and a convolutional code. The CRC block code only provides error detection capability and does not provide error correction capability. The burden is placed on the convolutional code to provide all error corrections. When a large software file is downloaded to a large number of remote stations, the need for error free reception is especially important. If the performance of the convolutional code is not adequate by itself, additional coding with either error correcting block code or convolutional code is necessary to ensure error free reception of the software file by the remote stations.

SUMMARY OF THE INVENTION

The present invention is a novel and improved communication system which provides error protection sufficient for over the air file transfer. In accordance with the present invention, data is encoded and decoded using a concatenated code comprising three coding steps, the steps being block coding or convolutional coding, CRC block coding, and convolutional coding. The encoded data is modulated and transmitted over the air.

It is an object of this invention to provide for error free file transfer over the air while maintaining conformance with the IS-99 standard by employing Reed-Solomon coding, CRC block coding, and convolutional coding. The file is partitioned into data frames which is Reed-Solomon encoded. CRC block encoding is then performed on the Reed-Solomon encoded data. The CRC encoded data is convolutionally encoded. The CRC block encoding and convolutional encoding are performed in accordance with the IS-99 standard. The additional Reed-Solomon encoding step provides improved error correction capability while maintaining compatibility with the IS-99 standard.

It is another object of this invention to provide for error free file transfer over the air while maintaining conformance to the IS-99 standard. The file is partitioned into data frames and encoded by a first encoding step. The first encoding step can be block encoding or convolutional encoding. The output from the first encoder is CRC block encoded. The CRC encoded data is then convolutionally encoded. The CRC block encoding and convolutional encoding are performed in accordance to the IS-99 standard. The additional first encoding step increases the coding gain while maintaining compatibility with the IS-99 standard.

It is yet another object of this invention to provide for error free file transfer over the air by providing a first coding step along with convolutional coding. The file is partitioned into data frames and encoded by a first encoding step. The first encoding step can be block encoding or convolutional encoding. If block encoding is used, Reed-Solomon encoding is preferred. The output from the first encoding step is convolutionally encoded. The output data is transferred over the air.

The foregoing, together with other objects, features and advantages of this invention, will become more apparent when referring to the following specification, claims and the accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
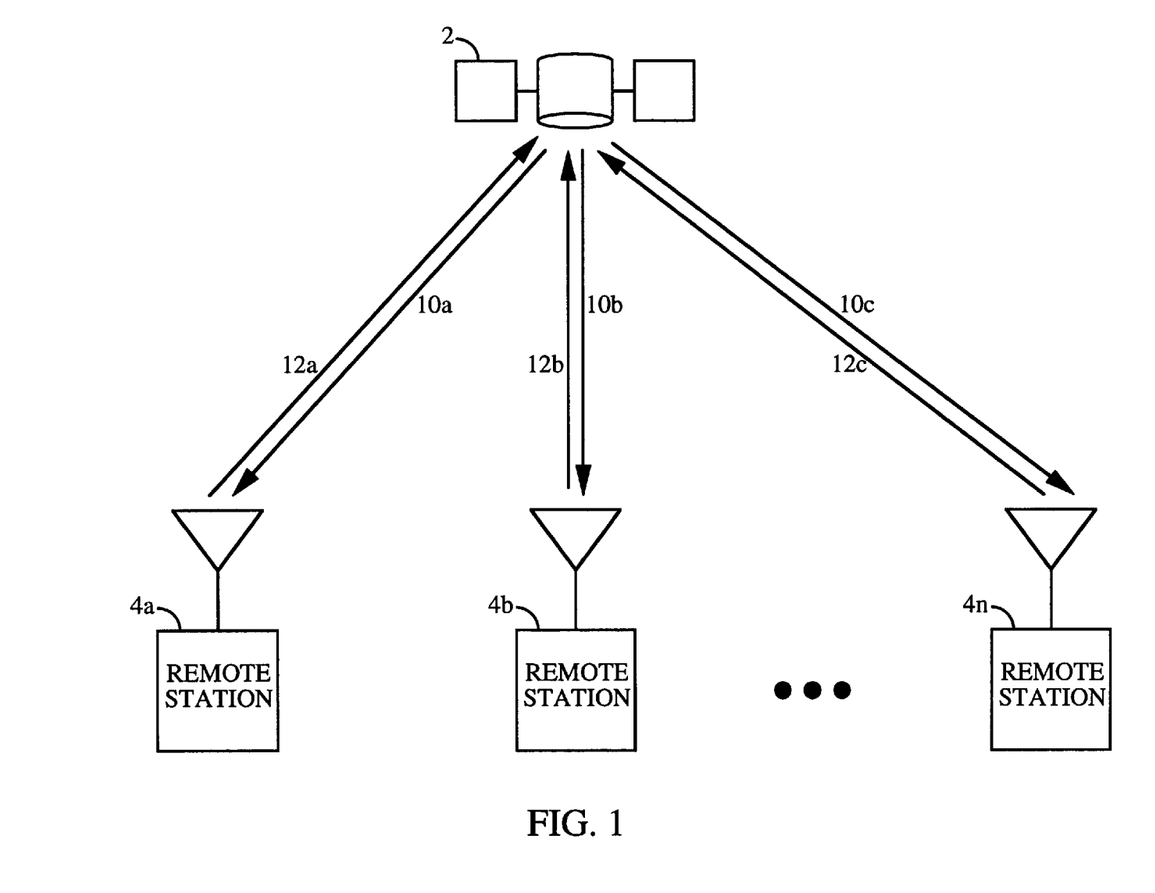
FIG. 1 is a block diagram of a digital transmission system.

Referring to the figures, FIG. 1 depicts a block diagram of a digital transmission system of the present invention. One such system is a code division multiple access (CDMA) communication system. In the exemplary embodiment, central station 2 contains a large amount of information, e.g. a large software file, which is to be downloaded to a large number of remote stations 4. Central station 2 encodes the data and transmits the signal over forward channels 10. Remote stations 4 receive the signal, decode the data, and transmit requests over reverse channels 12 for retransmission of the data frames received in error. The forward and reverse channels 10 and 12 can be satellite transmission channels or terrestrial transmission channels.

Figure 2:
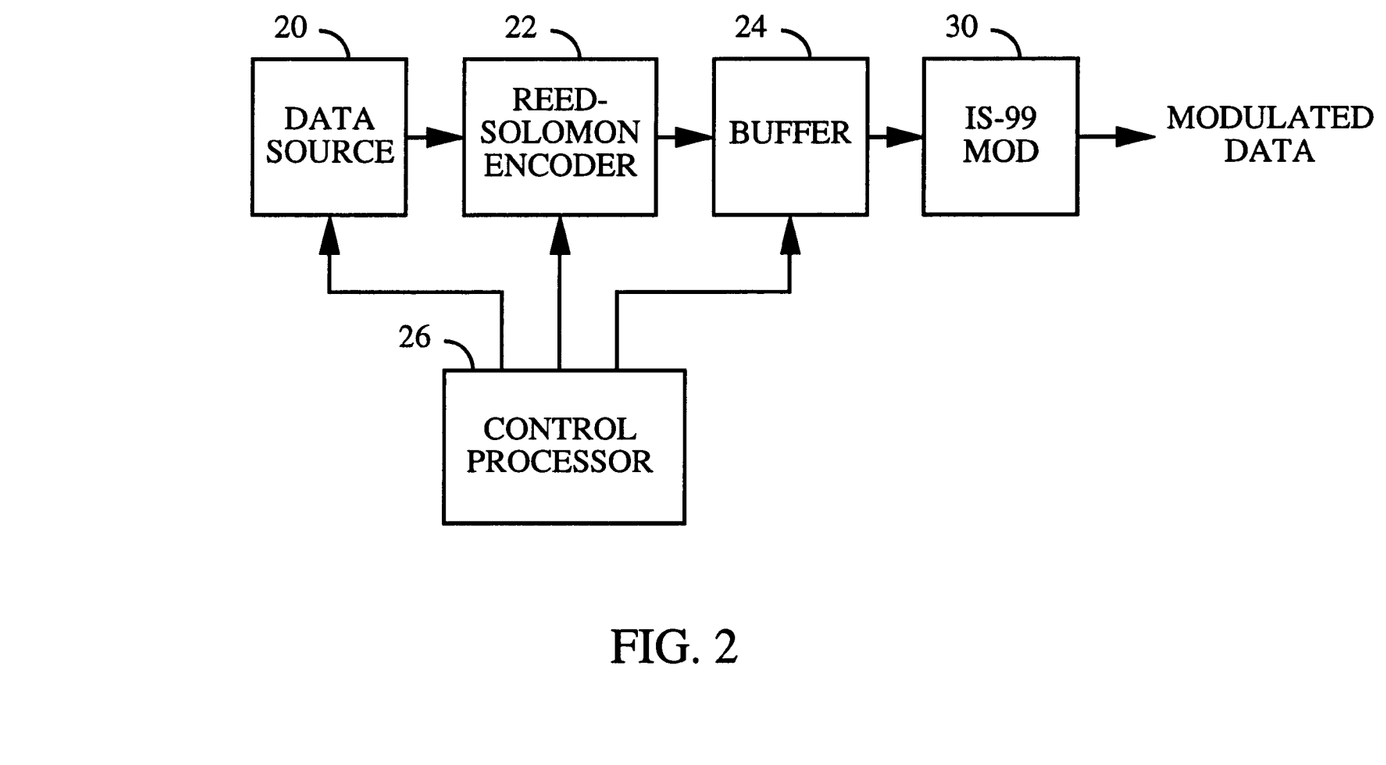
FIG. 2 is an exemplary block diagram of the central station encoder.

The exemplary block diagram of the encoder within central station 2 is shown in FIG. 2. Data source 20 contains the large amount of data such as a software file. The data is partitioned into data frames (see FIG. 4) and sent to Reed-Solomon encoder 22. Reed-Solomon encoder 22 encodes the data frames using Reed-Solomon block coding and provides the Reed-Solomon encoded data to buffer 24. Control processor 26 connects to data source 20, Reed-Solomon encoder 22, and buffer 24. Control processor 26 controls the manner which data is provided from data source 20, the operation of Reed-Solomon encoder 22, and the manner which Reed-Solomon decoded data is provided to buffer 24. For retransmission of data frames, control processor 26 directs data source 20 to provide the requested data frames. Control processor 26 can be implemented in a microcontroller, a microprocessor, a digital signal processing (DSP) chip, or an ASIC programmed to perform the function as described herein.

Figure 3:
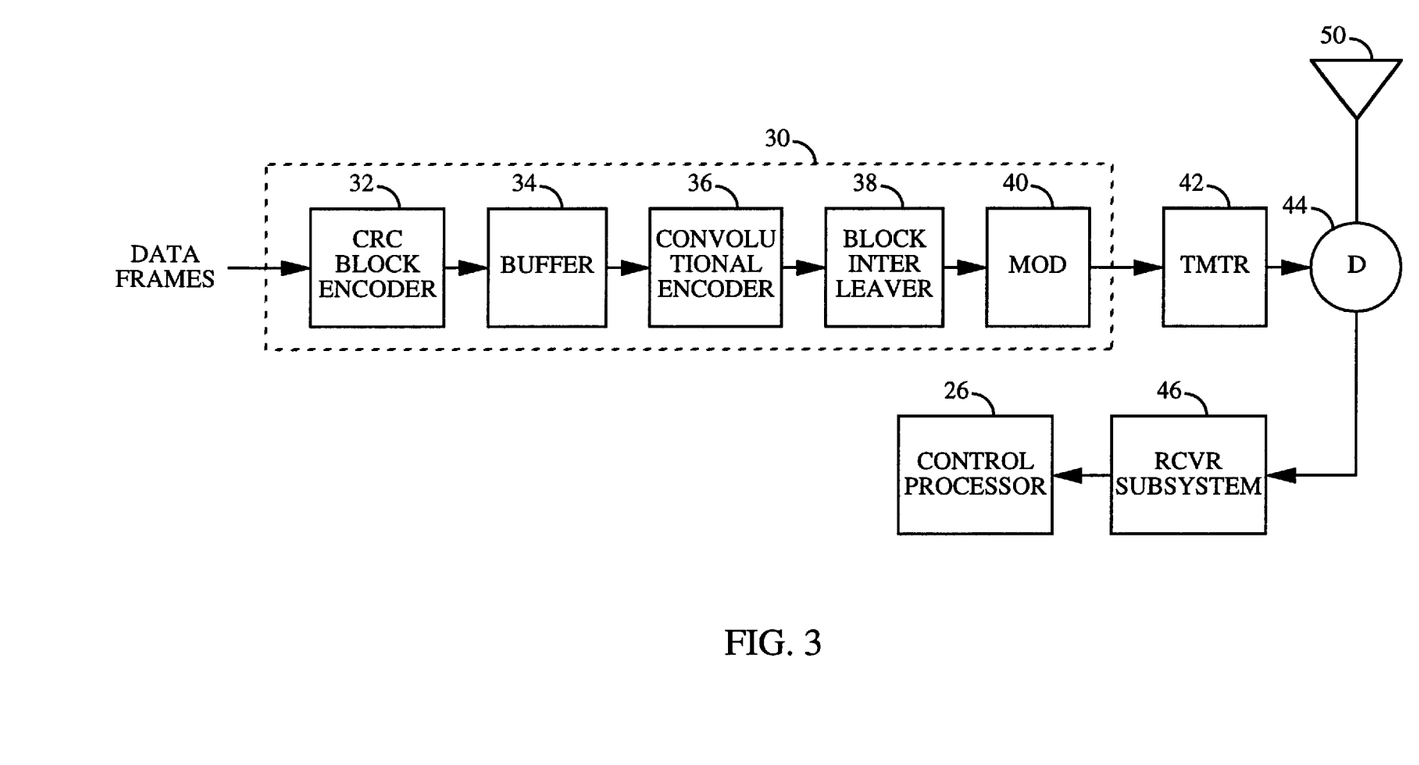
FIG. 3 is an exemplary block diagram of the IS-99 modulator and the signal processing within central station.

The exemplary block diagram of IS-99 modulator (IS-99 MOD) 30 and the signal processing within central station 2 is shown in FIG. 3. Within IS-99 modulator 30, CRC block encoder 32 receives the Reed-Solomon encoded data, in data frames, from buffer 34 and CRC block encodes the data frames to obtain the CRC bits. The data frames and the CRC bits are stored in buffer 34. Convolutional encoder 36 receives the CRC encoded data from buffer 34, convolutionally encodes the CRC encoded data, and provides the convolutionally encoded data to block interleaver 38. Block interleaver 38 reorders the bits and provides the interleaved data to modulator (MOD) 40. Modulator 40 spreads the interleaved data with the long pseudo noise (PN) code, the Walsh code, and the short PNI and PNQ codes. The spread data is provided to transmitter (TMTR) 42 which upconverts, filters, and amplifies the signal. The resultant RF signal is routed through duplexer 44 and transmitted by antenna 50.

The CRC block encoding and convolutional encoding are performed in accordance with the IS-99 standard. As such, the CRC block code and convolutional code are predefined for a given mode of operation. The IS-99 standard also specifies the exact order which data is written to block interleaver 38 by convolutional encoder 36 and read from block interleaver 38 by modulator 40.

Figure 4:
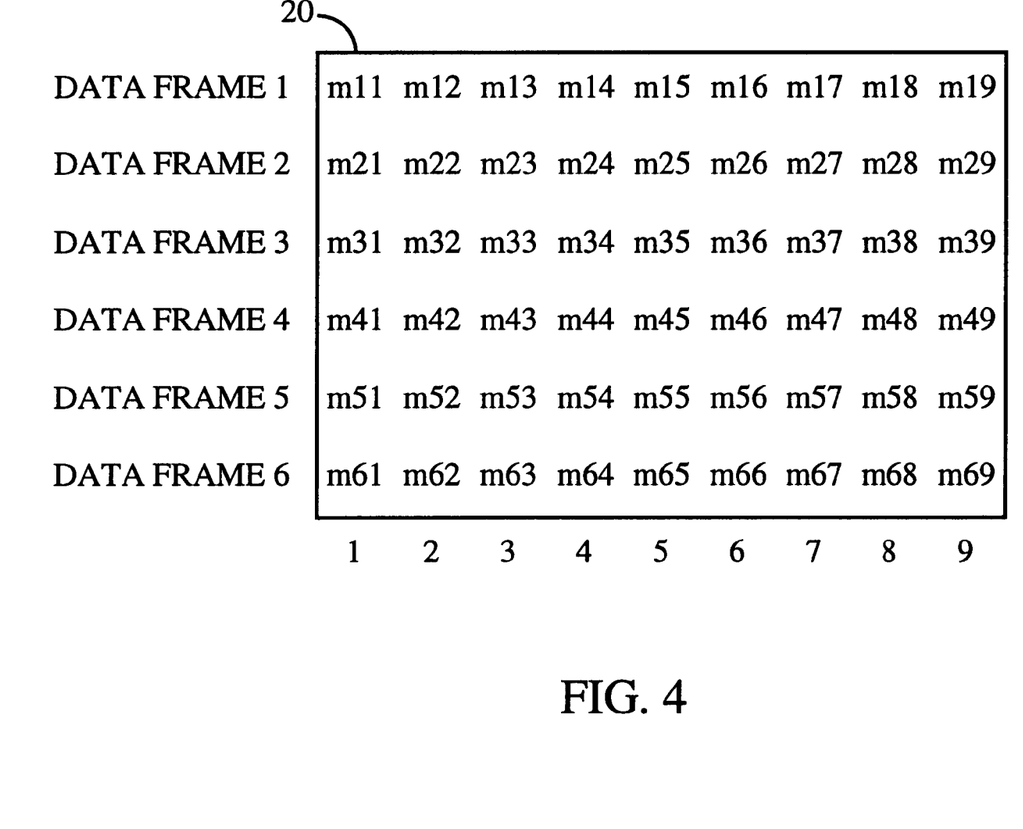
FIG. 4 is a diagram illustrating the content of the data source.

An exemplary illustration of the content of data source 20 is shown in FIG. 4. Data within data source 20 is partitioned into data frames. For example, data frame 1 comprises data bits m11, m12, m13, and so on and data frame 2 comprises data bits m21, m22, m23, and so on. The size of a data frame is predetermined by the IS-99 standard for a given mode of operation. For example, at the 9.6 Kbps data rate, there are 172 data bits per data frame. Each data frame in FIG. 4 is represented with only nine data bits for simplicity. In a communication system which operates without regard to the IS-99 standard, data frame sizes of any dimension which result in maximal performance and minimal hardware complexity are within the scope of the present invention.

Reed-Solomon block code is a non-binary code which operates on symbols composed of more than one bit. Therefore, the data bits from data source 20 are combined into q-bit symbols. In the exemplary embodiment, the data bits within the same data frame are combined to form a q-bit symbol. For example, data bits m11, m12, m13, and so on from data frame 1 are combined to form the first data symbol. Likewise, data bits m21, m22, m23, and so on from data frame 2 are combined to form the second data symbol.

The code rate (n,k) of Reed-Solomon encoder 22 determines the length of the output code words. A rate (n,k) Reed-Solomon encoder 22 encodes k data symbols into a code word of n code symbols. The code rate determines the error correction capability of the block code and the memory requirement. The present invention is directed to the use of any code rate (n, k).

Reed-Solomon code is a systematic block code. In a systematic block code, the k data symbols form the first k code symbols of the code word. The remaining n–k code symbols, referred to as the parity symbols, are formed by a linear combination of the k data symbols.

In the exemplary embodiment, Reed-Solomon encoder 22 encodes the data frames from data source 20 by columns and stores the output code words to buffer 24 in columns. Processing the data in data source 20 by columns and writing out to buffer 24 by columns results in data symbols containing bits m11, m21, m31, and so on (see FIG. 4) to be encoded to code symbols containing bits m11, m21, m31, and so on along with parity symbols containing bits R11, R12, and so on (see FIG. 5). In the exemplary embodiment, the k data symbols are from k data frames and the n code symbols of the code word are written across n frames. This processing order preserves the original data frames and results in the Reed-Solomon parity symbols being appended after the data frames (see FIGS. 4 and 5). By preserving the original data frames, the Reed-Solomon encoding step is transparent to the subsequent signal processing and allows the Reed-Solomon encoded data to be processed in accordance with the IS-99 standard without any modification to the hardware.

Alternately, the data symbols can also be formed by other ordering methods and encoded by other orders. For example, the data bits from different data frames can be combined to form the q-bit symbol. Thus, data bits m11, m21, m31, and so on can be combined to form the first data symbol and data bits m12, m22, m32, and so on can be combined to form the second data symbol. The Reed-Solomon encoding can then be performed by rows. Processing by rows results in the data symbols containing data bits m11, m12, m13, and so on to be encoded. The Reed-Solomon parity symbols can then be written to the same rows as the data symbols or can be written to another location in buffer 24, e.g. appended after the last data frame. Preserving the original data frames is preferred since the subsequent encoding can comply with the IS-99 standard. The present invention is applicable to any ordering methods employ to form and encode the data symbols.

Figure 6:
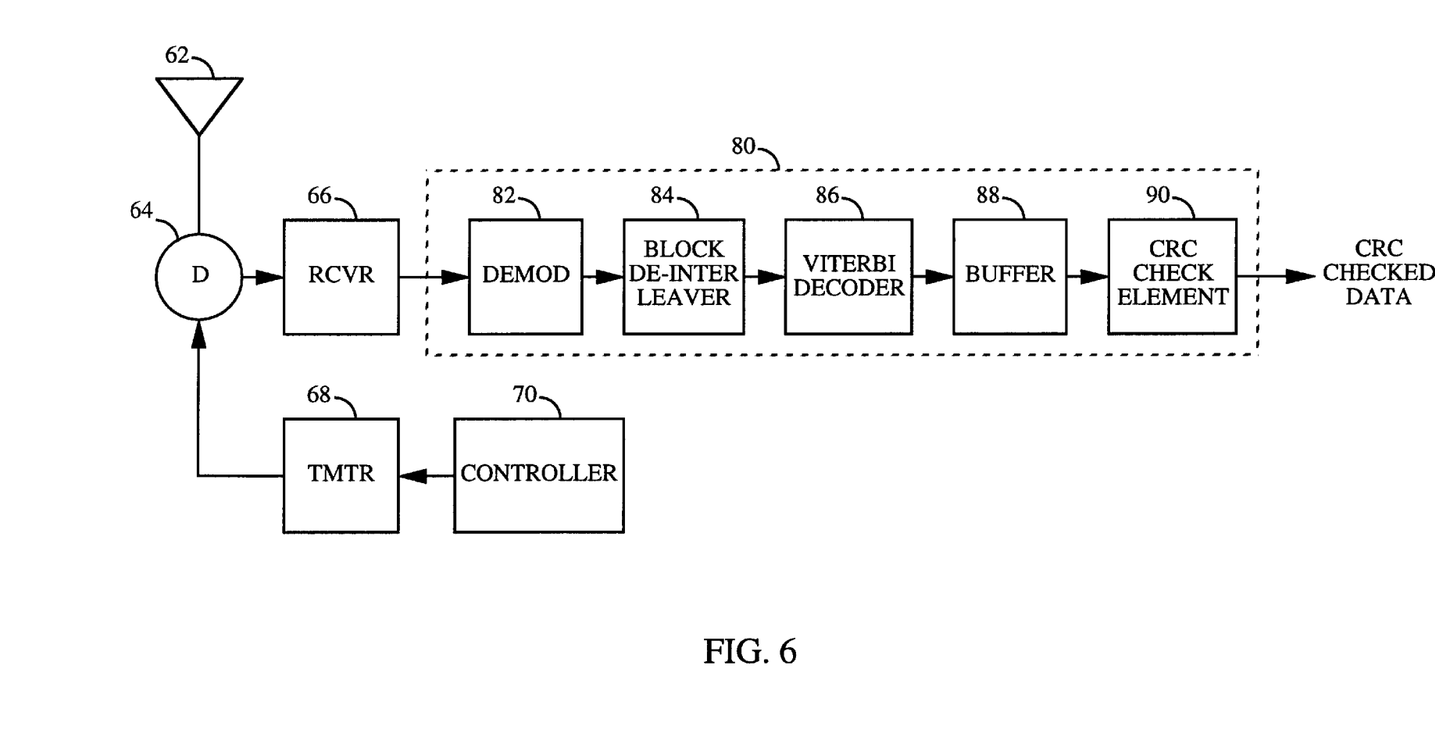
FIG. 6 is an exemplary block diagram of the IS-99 demodulator and the signal processing within the remote station.
Figure 7:
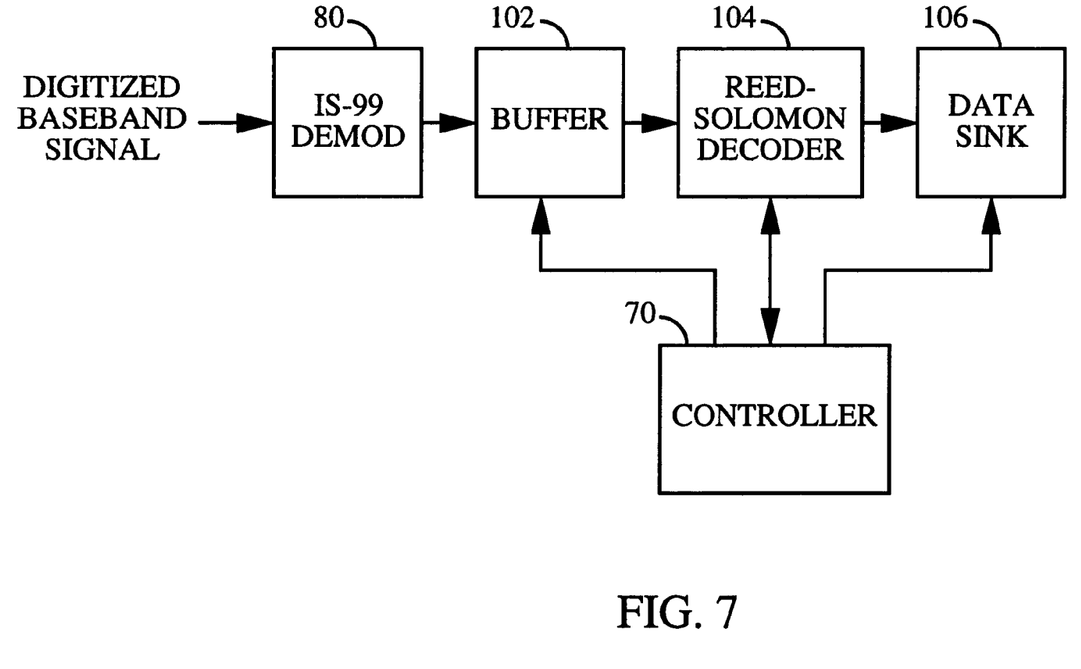
FIG. 7 is an exemplary block diagram of the remote station decoder.

An exemplary block diagram of IS-99 demodulator (IS-99 DEMOD) 80 and the signal processing within remote station 4 is shown in FIG. 6. The exemplary block diagram of the decoder within remote station 4 is shown in FIG. 7. The decoder within remote station 4 performs the inverse operation of the encoder within central station 2. Referring to FIG. 6, the transmitted signal is received by antenna 62, routed through duplexer 64, and provided to receiver (RCVR) 66. Receiver 66 downconverts, filters, amplifies, and quantizes the signal to obtain the digitized baseband signal. Demodulator (DEMOD) 82 receives the digitized baseband signal and performs the despread function using the short PN codes, the Walsh code, and the long PN code. The demodulated data is provided to block de-interleaver 84. Block de-interleaver 84 reorders the bits in the inverse order that was performed by central station 2. The de-interleaved data is provided to Viterbi decoder 86 and convolutionally decoded. The convolutionally decoded data is stored in buffer 88. CRC check element 90 receives the convolutionally decoded data and performs the CRC check to determine frame error. The demodulation and decoding as described above conforms to the IS-99 standard.

The subsequent signal processing is illustrated by the block diagram shown in FIG. 7. The CRC checked data from IS-99 demodulator 80, specifically CRC check element 90, is provided to buffer 102. The content of buffer 102 can be illustrated by FIG. 5, minus the CRC bits on the right hand side. Reed-Solomon decoder 104 receives the CRC checked data from buffer 102 and can perform Reed-Solomon decoding on the CRC checked data consistent with the processing order utilized by Reed-Solomon encoder 22. The Reed-Solomon decoded data is provided to data sink 106.

Typically, Reed-Solomon decoder 104 is not able to decode the code word until all code symbols for the code word are received. For communications which can not tolerate the additional decoding delay and which does not require the additional error correction capability provided by Reed-Solomon decoder 104, e.g. voice communication, the CRC checked data can be provided directly to data sink 106. For communications wherein additional decoding delay can be tolerated and wherein additional error correction capability is required, Reed-Solomon decoder 104 is used to decode the CRC checked data.

Controller 70 connects to buffer 102, Reed-Solomon decoder 104, and data sink 106. Controller 70 determines whether the Reed-Solomon decoding step needs to be performed based on detected frame errors from CRC check element 90 and controls the Reed-Solomon decoding. Specifically, controller 70 controls the manner which the CRC checked data is read from buffer 102, the operation of Reed-Solomon decoder 104, and the manner which the Reed-Solomon decoded data is provided to data sink 106. Controller 70 can be implemented in a microcontroller, a microprocessor, a digital signal processing (DSP) chip, or an ASIC programmed to perform the function as described herein.

In a CDMA communication system which conforms to the IS-99 standard, the CRC bits are only used to detect frame errors and there is no ability to correct errors within the frame. In the present invention, the additional Reed-Solomon decoding step provides error correction capability and eliminates most errors. In the occasional instances in which Reed-Solomon decoder 104 is not able to correct the errors, a request for retransmission can be generated. The request is processed by transmitter (TMTR) 68, routed through duplexer 64, and transmitted by antenna 62 (see FIG. 6). At central station 2 (see FIG. 3), the signal is received by antenna 50, routed through duplexer 44, and processed by receiver (RCVR) subsystem 46. Receiver subsystem 46 provides the request to control processor 26. Control processor 26 can command retransmission of some or all data frames received in error (see FIG. 2).

In the present invention, controller 70 can perform several functions depending on the outcome from CRC check element 90. The following discussion assumes that a rate (n,k) Reed-Solomon code is used at central station 2. The discussion also assumes the exemplary embodiment wherein the data frames comprise bits within a row and the Reed-Solomon code words comprise symbols within a column.

In the first scenario, if there are no frame errors, controller 70 can omit the Reed-Solomon decoding step since there is no error to correct. Furthermore, controller 70 can also command a transmission of a message to central station 2 acknowledging that the k data frames are received without error. Since there is no need for the Reed-Solomon parity symbols for these data frames, transmission of the Reed-Solomon parity symbols is wasteful. Therefore, central station 2 can eliminate transmission of the unnecessary Reed-Solomon parity symbols for the code words received correctly by remote stations 4.

In the second scenario, if the number of frame errors is greater than zero but less than or equal to (n−k), controller 70 can direct Reed-Solomon decoder 104 to perform Reed-Solomon decoding on the CRC checked data using one of many embodiments. It is known in the art that a Reed-Solomon code with n−k parity symbols can correct t symbol errors and simultaneously fill in f erased (or missing) symbols within a code word provided that $(2t+f) \leq (n-k)$. Controller 70 can direct Reed-Solomon decoding on the CRC checked data using one of the three embodiments described below. The three embodiments can also be combined to yield other Reed-Solomon decoding processes. Other embodiments or combinations of the embodiments described below are within the scope of the present invention.

In the first embodiment, for each frame error detected by CRC check element 90, controller 70 replaces the entire data frame with erasures. Controller 70 then directs Reed-Solomon decoding of the data symbols and erasures since it knows that the correct values of the erasures can be computed by Reed-Solomon decoder 104.

In the second embodiment, controller 70 directs Reed-Solomon decoding of the code words without any modification to the data frames in error. This embodiment works well if the error events within the data frames are short in duration. Within the Reed-Solomon decoding, if the number of symbol errors in the code word is less than or equal to $(n-k)/2$, the order of the error locator indicates the number of symbol errors within the code word and Reed-Solomon decoder 104 is able to correct all symbol errors within the code word. Code words with greater than $(n-k)/2$ symbol errors can place the error locator into a failure mode and result in the error locator pointing to the wrong location. For example, the failure mode can cause the error locator to point to a symbol in a data frame indicated as good by CRC check element 90. Alternatively, the failure mode can cause the error locator to point to a location which does not exist or to have multiple roots at one location. Code words with greater than $(n-k)/2$ symbol errors can be handled in one of the manners described below.

In the third embodiment, controller 70 can estimate the severity of the frame error to improve the Reed-Solomon decoding process. As noted above, Reed-Solomon decoder 104 can correct t symbol errors and simultaneously fill in f erased symbols within a code word provided that $(2t+f) \leq (n-k)$. A data frame containing many bits of error can be entirely replaced with erasures whereas a data frame with a few bits of error can be used without modification. Controller 70 is not able to determine the severity of the frame error by the use of the CRC check since CRC check element 90 provides a hard indication of a frame error if there is one or more bits of error within the data frame. However, controller 70 can use any soft metric, such as the accumulated Viterbi metric or the re-encoded CRC symbol error rate, to determine the severity of the data frame error. If the soft metric exceeds a predetermined threshold, controller 70 replaces the entire data frame with erasures. Otherwise, the data frame is used without modification. Controller 70 then directs Reed-Solomon decoding of code words containing erasures and/or possibly symbol errors.

And in the third scenario, if the number of frame errors is greater than (n−k), controller 70 can initiate or delay the Reed-Solomon decoding step since there may be more symbol errors than can be corrected by Reed-Solomon decoder 104. CRC check element 90 indicates a frame error if one or more bits within the data frame is received in error. A frame error does not indicate that all bits within that data frame are received in error. In fact, most of the bits within the error data frame may have been received correctly.

Controller 70 can initiate Reed-Solomon decoding of the code words even if the number of frame errors is greater than (n–k) by using either the second or third embodiment, or combination of the second and third embodiments, as described above for the second scenario. Thus, controller 70 can direct Reed-Solomon decoding of the code words without any modification to the error data frames. Alternatively, controller 70 can replace some of the error frames with erasures, based on a soft metric as described above, and direct Reed-Solomon decoding of the code words containing erasures and/or possibly symbol errors.

Controller 70 ensures that the number of erased data frames does not exceed (n–k). Each data frame which is entirely replaced with erasures reduces the ability of Reed-Solomon decoder 104 to correct other symbol errors in the code word. In fact, f erasures within a code word reduces the number of redundant symbols in the code word to (n–k–f) and limits Reed-Solomon decoder 104 to correct only (n–k–f)/2 symbol errors within the code word.

Alternately, in the third scenario, controller 70 can delay the Reed-Solomon decoding if the number of frame errors is greater than (n–k) or if the number of symbol errors is greater than (n–k)/2. Controller 70 can request retransmission using one of several embodiments. In the first embodiment, controller 70 can request retransmission of all data frames received in error or only enough data frames received in error to perform Reed-Solomon decoding of the remaining data frames. For example, if controller 70 determines that the number of data frames received in error is (n–k)+3, controller 70 can request retransmission of 3 or more data frames. Upon correct receipt of three or more data frames which were previously received in error, Reed-Solomon decoder 104 is able to decode (and correct) all data frames received in error. After enough data frames which were previously received in error are subsequently received correctly, such that the number of frame errors is less than (n–k), controller 70 can initiates the Reed-Solomon decoding. In the second embodiment, controller 70 can request retransmission of the code words received in error, without regard to data frame errors. This embodiment may be more efficient than the first embodiment since there may be many frame errors but only a few code word errors. In fact, controller 70 can decide to use the first or second embodiment after determining which embodiment results in less retransmission.

As an example of the third scenario, assume that a rate (15, 11) Reed-Solomon code is used and that central station 2 is transmitting to one remote stations 4. Assume further that remote station 4 receives data frames 1, 3, 4, 7 and 9 in error. Reed-Solomon decoder 104 is able to correct two frame errors or less or compute the values for four erasures within the code word.

Controller 70 can initiate the Reed-Solomon decoding step even if the number of frame errors is greater than (n–k). Controller 70 can direct Reed-Solomon decoding of the code words without any modification to the data frames received in error. There may be high likelihood that each code word contains two symbol errors or less even though there are five frame errors. If this is true, Reed-Solomon decoder 104 is able to correct all symbol errors even though the number of frame errors is greater than (n–k).

Controller 70 can also entirely replace some data frames received in error with erasures based on a soft metric. For example, controller 70 can replace data frames 3 and 7 with erasures and direct Reed-Solomon decoding of code words containing two erasures and possibly up to one additional symbol error in a given Reed-Solomon code word. The two erasures reduce the number of redundant symbols from four down to two. Therefore, Reed-Solomon decoder 104 is only able to correct one symbol error in each code word.

Alternately, remote station 4 can transmit a message to central station 2 indicating the data frames received in error. Control processor 26 within central station 2 can direct retransmission of one or more data frames, since correct reception of only one data frame by remote station 4 would enable Reed-Solomon decoder 104 to successfully decode the other four data frames received in error.

Using the above example, assume further that central station 2 is also transmitting to a second remote stations 4. and that the second remote stations 4, receives data frames 1, 3, 5, 7 and 9 in error. The first and second remote station 4 can transmit a message to central station 2 indicating the data frames received in error. Control processor 26 can direct retransmission of only data frame 1, since reception of this data frame by the first and second remote station 4 would enable Reed-Solomon decoders 104 in each of the two remote stations 4 to successfully decode the other four data frames received in error. Therefore, correct reception of the retransmitted data frame 1 allows the first remote station 4 to correct data frames 3, 4, 7 and 9 which are received in error. Likewise, correct reception of the retransmitted data frame 1 allows the second remote station 4 to correct data frames 3, 5, 7 and 9 which are received in error. Alternately, control processor 26 can direct retransmission of all data frames received in error by both remote stations 4. In this case, data frames 1, 3, 4, 5, 7 and 9 are retransmitted by central station 2. And finally, controllers 70 within remote station 4 can initiate the Reed-Solomon decoding step even though each remote stations 4 receives five frame errors.

In the present invention, the additional coding gain provided by the additional Reed-Solomon coding step ensures correct data reception by many remote stations 4 and minimizes the number of requests for retransmission. As an illustration, assume that a Reed-Solomon block code with k/n=1/1.35 is used and that 1350 code symbols containing 1000 data symbols are transmitted. Assume further that the probability of erasure (e.g. at least n–k symbols in a code word are received in error) is 20 percent. It can be shown that transmission of 1350 code symbols containing 1000 data symbols can be correctly receive by 999 out of 1000 remote stations 4. Thus, the Reed-Solomon coding step improves the code word error rate from 20% to approximately 0.1%. Remote stations 4 which receive the code symbols in error can notify central station 2 to retransmit the data frames or the code word corresponding to the code symbols received in error. The retransmission continues until the code symbols are received without error.

The theory and operation of Reed-Solomon block coding is well-known in the art and described in the prior cited references. The operation of the Reed-Solomon encoder and decoder is briefly described below to assist in the understanding and appreciation of the present invention.

In a Reed-Solomon block code, the q data bits are combined to form a q-bit symbol. Reed-Solomon code achieves the largest possible code minimum distance $d_{min}$) for any linear code with the same input (k) and output (n) block length. Minimum distance is determinative of the error correcting capability of the code. The (n,k) Reed-Solomon code is capable of correcting up to (n−k)/2 symbol errors within a block of n code symbols.

Figure 8:
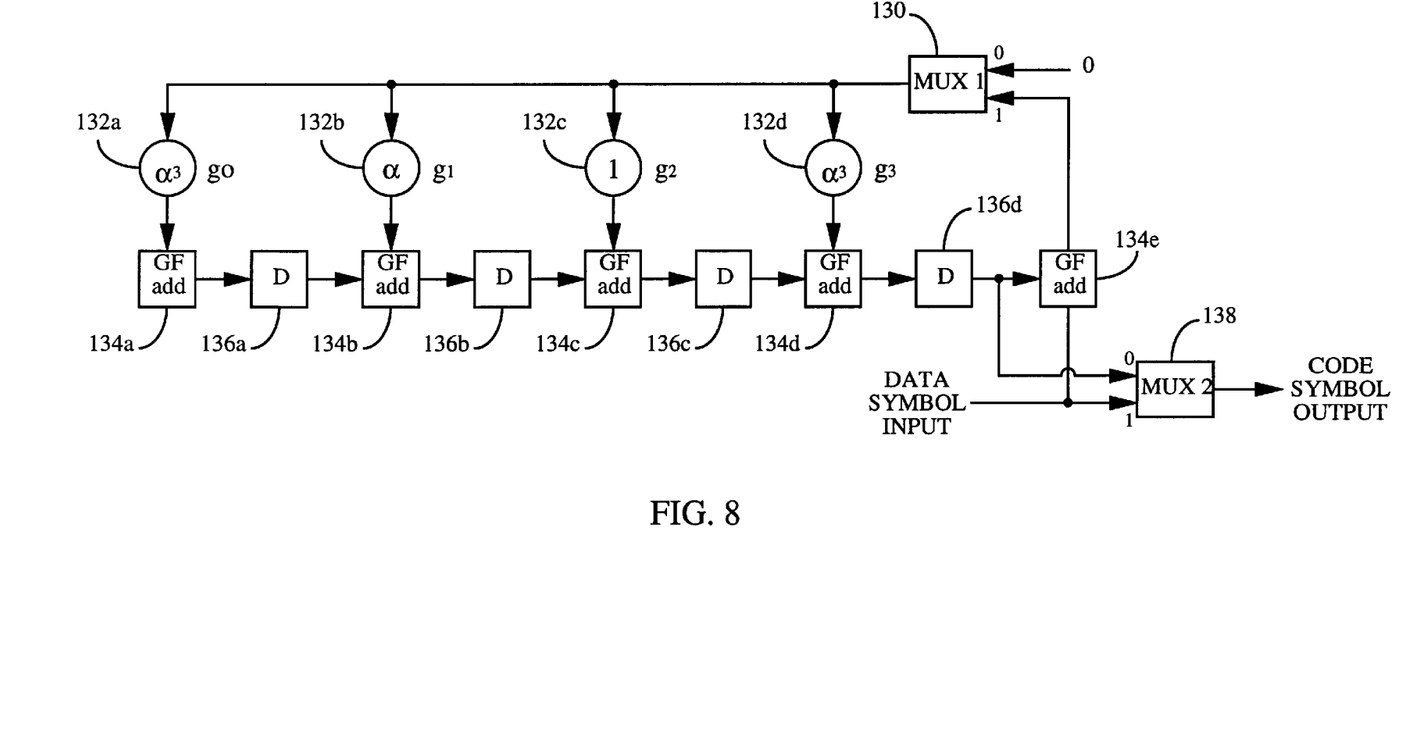
FIG. 8 is a diagram of a rate (7,3), $GF(2^3)$ Reed-Solomon encoder.

An exemplary Reed-Solomon encoder is shown in FIG. 8 for a rate (7,3) code defined over $GF(2^3)$ where q=3, n=7, k=3, and the data and code symbols are defined by the set {0, 1, $\alpha$, $\alpha^2$, $\alpha^3$, $\alpha^4$, $\alpha^5$, $\alpha^6$}. The generator polynomial is $g(x)=x^4+g_3 \cdot x^3+g_2 \cdot x^2+g_1 \cdot x^1+g_0=x^4+\alpha^3 \cdot x^3+x^2+\alpha \cdot x^1+\alpha^3$. Initially, the n−k registers 136 are reset to 0 and MUX1 130 and MUX2 138 are selected to the '1' position to allow the k data symbols to be routed to the MUX outputs. After k data symbols have been shifted in, MUX1 130 and MUX2 138 are toggled to the '0' position to allow the n−k parity symbols to be read from registers 136. The coefficients of the generator polynomial g(x) are shown within GF multipliers 132. GF add 134 are Galois field adders.

The first step in decoding Reed-Solomon code involves calculating a set of syndromes from the received n code symbols. The syndromes indicate whether any symbol error in the code word has occurred. The error coefficient, $\sigma(x)$, of the error location polynomial is calculated using the syndromes and from this, the error locators Xi and the error values Yi are computed. With the error locators and error values, the symbols in error are located and corrected.

Figure 9:
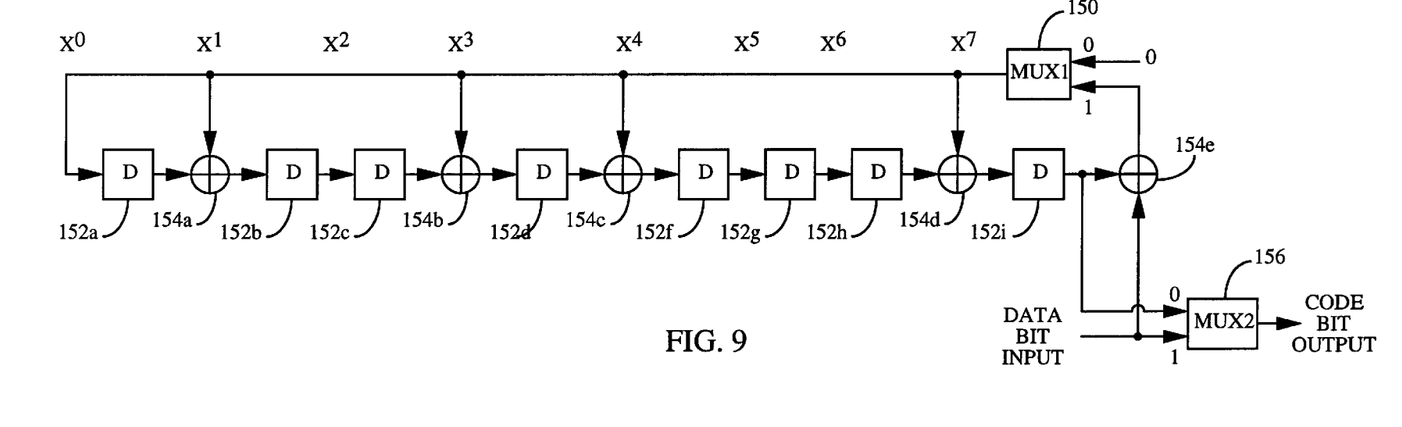
FIG. 9 is a diagram of the rate (88,80) CRC block encoder which conforms to the IS-99 standard.

The CRC block code is also systematic, cyclic, and linear. Therefore, generation of the CRC bits is achieved in the same manner as for the Reed-Solomon code. In fact, since CRC block code is binary, the Galois field adders can be replaced with simple exclusive-OR gates and the Galois field multiplier are eliminated. The diagram of the rate (88,80) CRC block encoder for one mode of operation supported by the IS-99 standard is shown in FIG. 9. The generator polynomial for rate (88,80) CRC block encoder is $g(x)=x^8+x^7+x^4+x^3+x+1$. Initially, the eight registers 152 are reset to 0 and MUX1 150 and MUX2 156 are selected to the '1' position to allow the data bits to be routed to the MUX outputs. After 80 data bits have been shifted in, MUX1 150 and MUX2 156 are toggled to the '0' position to allow the eight parity bits to be read from registers 152. Adders 154 are modulo-2 adders which can be implemented with exclusive-OR gates.

The IS-99 standard also specify the use of the rate (184,172) CRC block encoder for some modes of operation. The generator polynomial for the rate (184,172) CRC block encoder is $g(x)=x^{12}+x^{11}+x^{10}+x^9+x^8+x^4x+1$.

Convolutional coding is well known in the art and the theory and operation of convolutional encoding and Viterbi decoding can be appreciated by reference to any of the prior cited references. The implementation of the convolutional encoding and Viterbi decoding is briefly described below to facilitate appreciation of the present invention.

Figure 10:
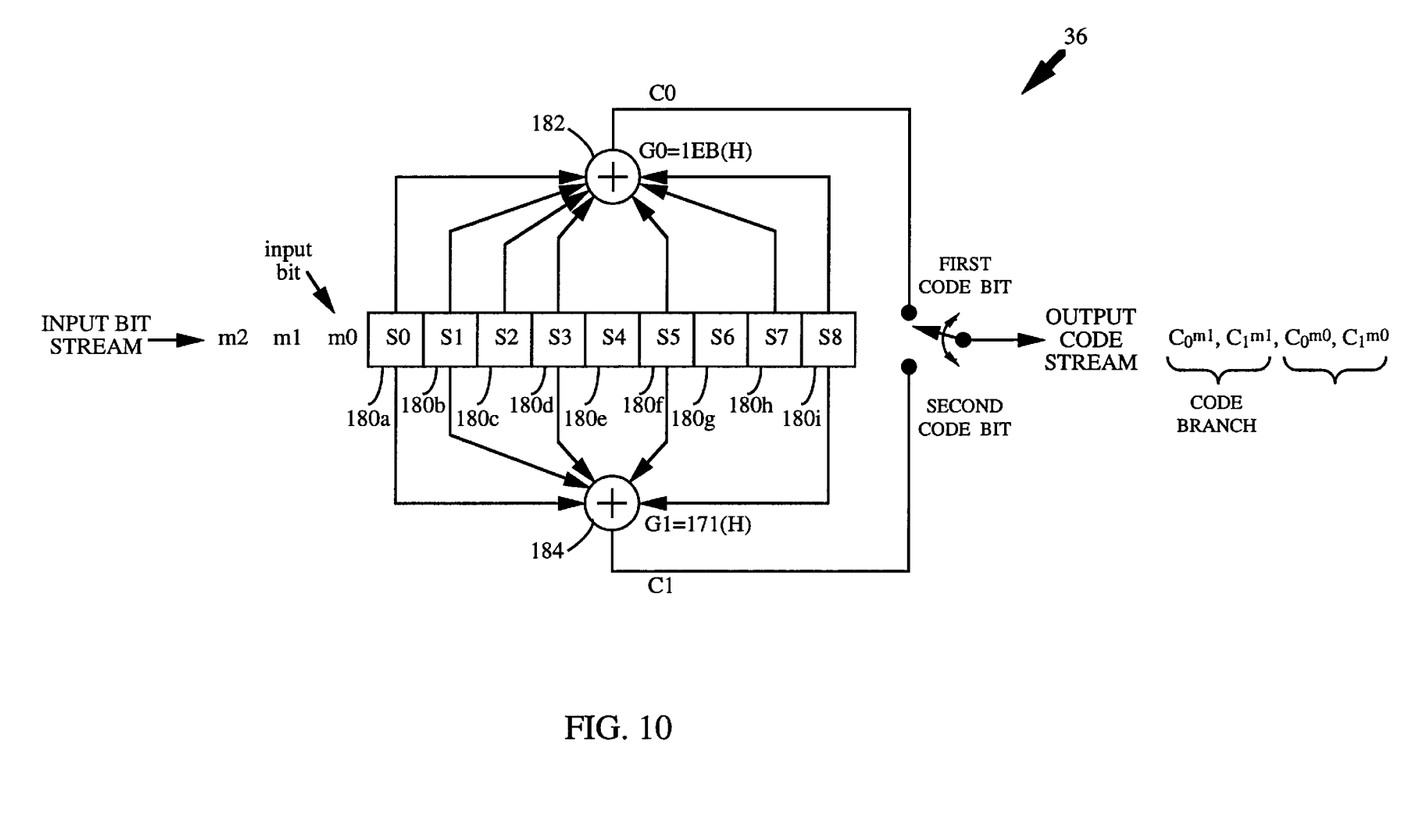
FIG. 10 is a diagram of the rate 1/2, K=9 convolutional encoder which conforms to the IS-99 standard.
Figure 11:
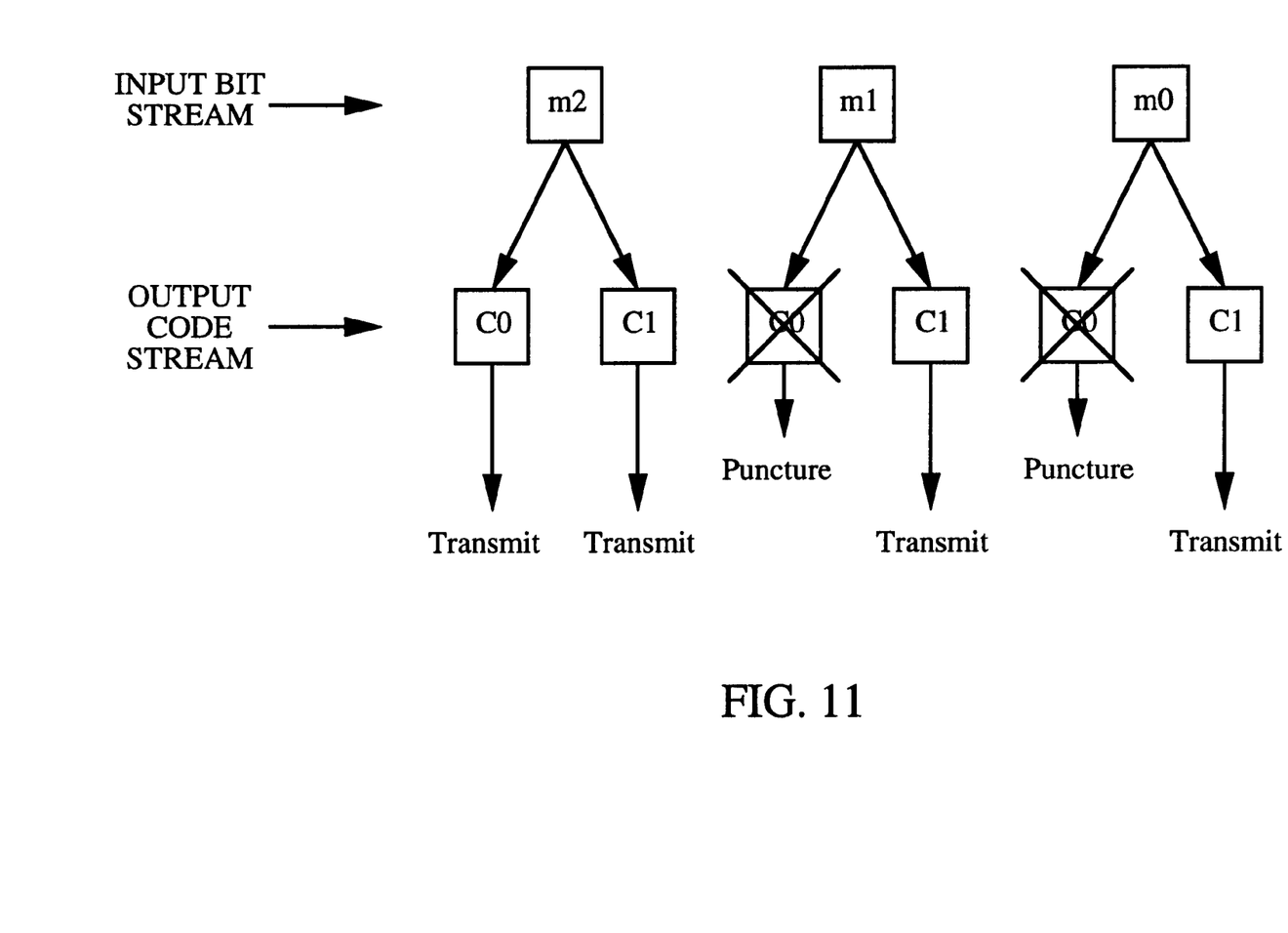
FIG. 11 is a diagram of a rate 3/4 puncture state from a rate 1/2 convolutional encoder.

A rate 1/2, K=9 convolutional encoder 36 in accordance to the IS-99 standard is shown in FIG. 10. The input data bits are encoded according to the generator polynomials G(x) where G0=1EB (Hex) and G1=171 (Hex). The nine registers 180 are determined by the constraint length K=9. Adders 182, 184 are modulo-2 adders. Each input data bit results in two code bits C0 and C1. The code bit pair forms a code branch. For a rate 1/2 convolutional encoder both code bits are transmitted. For a rate 3/4 convolutional encoder punctured from a rate 1/2 convolutional encoder, three data bits are encoded into six code bits and only four code bits are transmitted. The other two code bits are punctured or deleted. The rate 3/4 puncture state is shown in FIG. 11.

Convolutional decoding is well known in the art and any trellis decoder can perform decoding of convolutionally encoded data. In the preferred embodiment, Viterbi decoder 86 is utilized for convolutional decoding. Viterbi decoding is performed by computing a set of branch metrics, updating the path metrics with the branch metrics, determining the path with the minimal path metrics, and storing the survival path for each state into a path memory. The constraint length K determines the number of states and influences the selection of the traceback depth. These two parameters define the memory requirement of the path memory. The traceback depth also determines the latency in the Viterbi decoding process. Punctured codes, such as the rate 3/4 which is not specified by the IS-99 standard, increase the traceback depth and the latency.

In the second embodiment of the present invention, Reed-Solomon encoder 22 can be replaced with a first convolutional encoder. The first convolutional encoder encodes data from data source 20 by rows or columns and can write the code bits to buffer 24 by rows or columns. Data can be processed in any one of four possible ordering and the optimal ordering is determined by the system design. The code rate and the constraint length K of first convolutional encoder are system design parameters. Different code rates results in the data from data source 20 to be partitioned into different data frame sizes since the CRC encoded frame size of buffer 34 (see FIG. 5) is fixed by the IS-99 standard. The present invention is directed to any combination of code rate and constraint length for the first convolutional encoder.

In the second embodiment wherein Reed-Solomon encoder 22 is replaced with a first convolutional encoder, several design parameters are taken into considerations in the design of the first convolutional encoder. A long constraint length results in more complex decoding circuitry and increased latency. The code rates of the first convolutional encoders and convolutional encoder 36 reduce the effective data throughput rate. For example, a rate 1/2 first convolutional encoder in conjunction with a rate 1/2 convolutional encoder 36 results in an overall data throughput rate of 1/4. The transmitted encoded data is four times the size of the original file, not including other overhead bits. Other puncture rates, such as rate 3/4, improve the data throughput rate but provide less coding gain. A design tradeoff should be considered. As an additional consideration, Viterbi decoder 86 has tendency to output correlated bursts of errors. Therefore, some interleaving between first convolutional encoder and convolutional encoder 36 is desirable.

Figure 5:
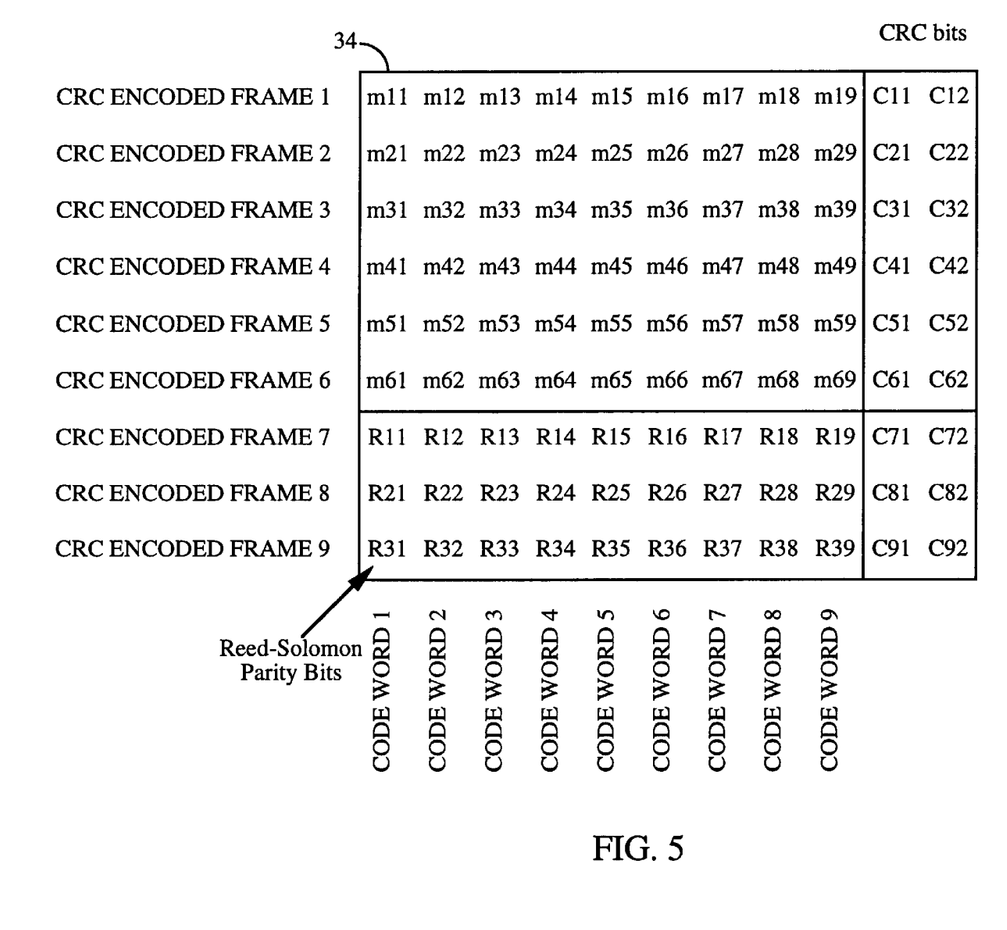
FIG. 5 is a diagram illustrating the content of the buffer after the CRC block encoder.

The block diagram of the encoder within central station 2 shown in FIGS. 3 and 4 contains two separate buffers 24 and 34. The two buffers 24 and 34 are shown for illustration only. In practice, it may be possible to implement buffers 24 and 34 using one block of memory as shown in FIG. 5. Data from data source 20 can be written to one corner of the memory. Reed-Solomon encoding and CRC block encoding are performed and the parity bits from these encoding steps are written to separate locations of the same memory.

Block interleaver 38 performs interleaving of the code bits from convolutional encoder 36. As such, the order which data is written to and read from block interleaver 38 is specifically defined by the IS-99 standard. The interleaving 'whitens' the affect of error bursts caused by the channel impairments. In a satellite link wherein the channel characteristic is predominately 'white', block interleaver 38 may be eliminated without degradation in performance.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for encoding data files for over-the-air transfer while maintaining conformance to IS-99 standard comprising:
    a first encoder for encoding the data file to produce a first encoded data file;
    a CRC block encoder connected to receive said first encoded data file and constructed to produce a second encoded data file; and
    a convolutional encoder connected to receive said second encoded data file;
    wherein said CRC block encoder and said convolutional encoder are defined by IS-99 standard.

2. An apparatus of claim 1 wherein said first encoder is a block encoder.

3. An apparatus of claim 1 wherein said first encoder is a Reed-Solomon block encoder.

4. An apparatus of claim 1 wherein said first encoder is a convolutional encoder.

5. An apparatus for encoding data files for over-the-air transfer while maintaining conformance to IS-99 standard comprising:
    a first encoder for encoding the data file to produce a first encoded data file;
    a CRC block encoder connected to receive said first encoded data file and constructed to produce a second encoded data file;
    a convolutional encoder connected to receive said second encoded data file and constructed to produce a third encoded data file; and
    a buffer for storing said third encoded data file;
    wherein said CRC block encoder and said convolutional encoder are defined by IS-99 standard and said third encoded data is written to said buffer and read from said buffer in a predetermined order defined by IS-99 standard.

6. An apparatus of claim 5 wherein said first encoder is a block encoder.

7. An apparatus of claim 5 wherein said first encoder is a Reed-Solomon block encoder.

8. An apparatus of claim 5 wherein said first encoder is a convolutional encoder.

9. An apparatus for receiving a data file encoded in conformance with IS-99 standard and transferred over-the-air comprising:
    a convolutional decoder for decoding said encoded data file to produce a first decoded data file;
    a CRC check element connected to receive said first decoded data file, and constructed to perform a CRC check of said first decoded data file, said CRC checked data comprising CRC decoded data frames; and
    a second decoder connected to receive said CRC checked data and constructed to produce a second decoded data file.

10. The apparatus of claim 9 wherein said second decoder is a Reed-Solomon decoder.

11. The apparatus of claim 10 wherein said CRC checked data frames indicated as error frames by said CRC check element are replaced with erasures.

12. The apparatus of claim 10 wherein said CRC checked data frames indicated as error frames by a soft metric are replaced with erasures.

13. The apparatus of claim 10 further comprising:
    a transmitter for transmitting a message indicative of CRC checked data frames which are indicated as error frames by said CRC check element.

14. A method for encoding a data file, comprising the steps of:
    partitioning the data file into a plurality of data frames;
    encoding each data frame to produce first encoded data frames;
    appending Cyclic Redundancy Check (CRC) bits to said first encoded data frames to produce second encoded data frames; and
    convolutionally encoding said second encoded data frames to produce third encoded data frames;
    wherein said appending step and said convolutionally encoding step are in compliance with an IS-99 standard.

15. The method of claim 14 wherein the step of encoding said first encoded data frame comprises block encoding.

16. The method of claim 15 wherein the step of block encoding said first encoded data frame comprises Reed-Solomon encoding.

17. The method of claim 14 wherein the step of encoding said first encoded data frame comprises convolutional encoding.

18. A method for encoding a data file, comprising the steps of:
    partitioning the data file into a plurality of data frames;
    using a IS-99 compliant encoder to encode each data frame to produce a first encoded data frame;
    using a CRC encoder to append CRC bits to said first encoded data frames to produce second encoded data frames; and
    using a convolutional encoder to encode said second encoded data frames to produce third encoded data frames;
    wherein said CRC encoder and said convolutional encoder are compliant to an IS-99 standard.

19. The method of claim 18 wherein the step of encoding said first encoded data frame uses a block encoder.

20. The method of claim 19 wherein the step of encoding said first encoded data frame uses a Reed-Solomon encoder.

21. The method of claim 18 wherein the step of encoding said first encoded data frame uses a convolutional encoder.

22. A method for decoding data frames, said decoding method comprising the steps of:
    using an IS-99 demodulator to demodulate said data frames; and
    using a Reed-Solomon decoder to decode said demodulated data frames;
    wherein said decoding method further uses a controller, said controller performing the steps of:
        receiving a frame error indicator from said IS-99 demodulator; and
        using said frame error indicator to decide whether to omit said Reed-Solomon decoding step.

23. The decoding method according to claim 22, wherein said frame error indicator indicates an error, and said controller decides to use said Reed-Solomon decoding step, wherein said controller further decides to replace a data frame with an erasure before using said Reed-Solomon decoding step.

24. The decoding method of claim 22, wherein said frame error indicator indicates an error, and said controller decides to omit said Reed-Solomon decoding step, wherein said controller further decides to send a retransmission request after deciding to omit said Reed-Solomon decoding step.

25. A method of decoding data files, said decoding method comprising the steps of:

demodulating data files using an IS-99 compliant demodulator; and     selectively implementing a Reed-Solomon decoder upon the IS-99 demodulated data files;

wherein the implementation of the Reed-Solomon decoder is determined by a controlling step, the controlling step comprising the steps of:

using a controller to receive frame error information from the IS-99 demodulator; and         using said controller to select and then implement exactly one of the following steps:

a. Omit the decoding step using the Reed-Solomon decoder if the frame error information indicates no errors;

b. Implement the decoding step using the Reed-Solomon decoder if the frame error information indicates errors;

c. Replace errors with erasures and then implement the decoding step using the Reed-Solomon decoder if the frame error information indicates errors; or             d. Send a retransmission request over-the-air and omit implementing the decoding step using the Reed-Solomon decoder.

\* \* \* \* \*